United States Patent

[11] 3,599,863

| | | |
|---|---|---|
| [72] | Inventor | Balthasar H. Pinckaers<br>Edina, Minn. |
| [21] | Appl. No. | 856,062 |
| [22] | Filed | Sept. 8, 1969 |
| [45] | Patented | Aug. 17, 1971 |
| [73] | Assignee | Honeywell Inc.<br>Minneapolis, Minn. |

[54] ELECTRIC CLOCK THERMOSTAT HAVING PHASE RESPONSIVE CONTROL APPARATUS
4 Claims, 2 Drawing Figs.

[52] U.S. Cl.................................................... 236/46,
219/492, 317/132
[51] Int. Cl............................................... G05d 23/275,
G04c 23/00
[50] Field of Search.............................................307/252.70,
252.90; 219/492; 236/46, 78, 74; 317/132

[56] References Cited
UNITED STATES PATENTS
| | | | | |
|---|---|---|---|---|
| 2,030,933 | 2/1936 | Persons ...................... | | 236/46 X |
| 3,326,275 | 6/1967 | Ray .............................. | | 236/68 X |
| 3,418,497 | 12/1968 | Sauter et al.................. | | 307/252 |

*Primary Examiner*—William E. Wayner
*Attorneys*—Lamont B. Koontz, Francis A. Sirr and Clyde C. Blinn ABSTRACT: A power supply and phase-responsive apparatus connected by two wires to a remote electric clock thermostat for supplying power to the clock motor and connecting a temperature-responsive switch apparatus in the thermostat over the same two wires to a relay associated with the phase-responsive apparatus for controlling temperature-conditioning apparatus furnishing heated air from a furnace to the space containing the clock thermostat. The phase-responsive apparatus responding to the phase of the voltage and current supplied to the clock thermostat whereby normally with only the clock operating, the current lags the voltage, but upon the temperature-responsive switch apparatus closing an additional capacitive circuit, the current is either in phase or leads the voltage to result in the energization of the relay and thus the conditioning apparatus.

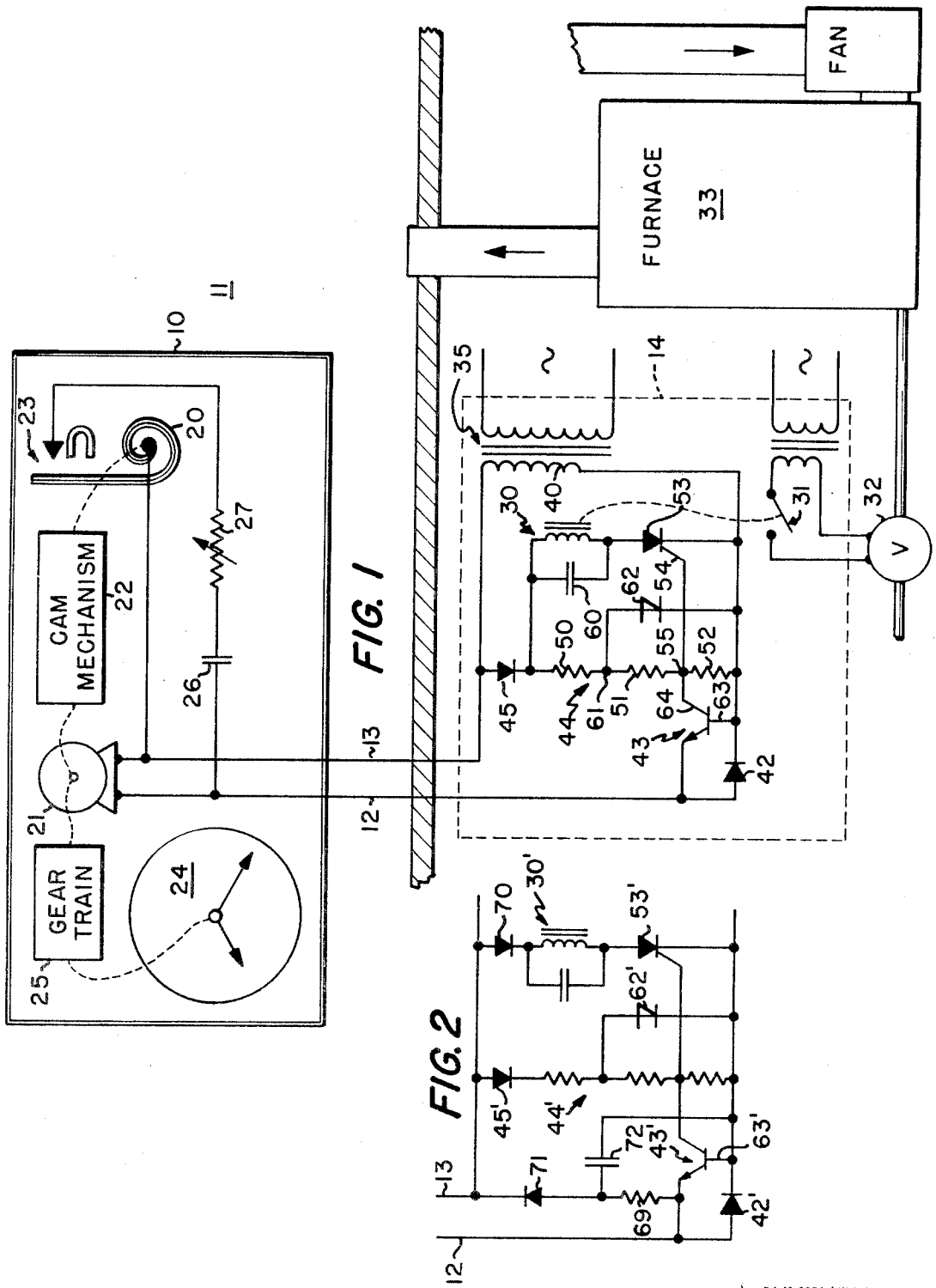

3,599,863

ELECTRIC CLOCK THERMOSTAT HAVING PHASE RESPONSIVE CONTROL APPARATUS

BACKGROUND OF THE INVENTION

For many years, electric clock thermostats have been used for controlling temperature-conditioning apparatus such as a furnace in a dwelling. An electric clock thermostat generally has a temperature-responsive switch apparatus similar to the conventional thermostat which is connected to control the furnace. Associated with the temperature-responsive switch apparatus is an electric clock motor which is connected to a cam mechanism to selectively adjust the control point of the temperature-responsive switch apparatus to select different temperatures to be maintained in the space by thermostat. Such selections are made by the homeowner by setting the clock mechanism to adjust the control point of the thermostat to different levels during different time periods such as a lower temperature setting during the nighttime. Such electric clock thermostats as shown in the Willis H. Gille U.S. Pat. No. 2,632,797 have for some time required at least three wires to connect the clock thermostat to an associated remote control apparatus for the furnace.

In a copending patent application of Clifford L. Nelson, et al., Ser. No. 861,023 filed Sept. 25, 1969, an electric clock thermostat is disclosed for use with a two-wire circuit to supply power to the clock motor and provide a control circuit on the same two wires. When a conventional thermostat is connected to the remote control apparatus for controlling the furnace, a two-wire circuit is generally used. The replacement of the conventional thermostat can be made with an electric clock thermostat of the Nelson et al. application without the need of additional wires.

The present invention provides for an improved electric clock thermostat which has a clock motor requiring a power circuit and a temperature-responsive switch apparatus which can be connected to a remote power supply and furnace control apparatus over two wires making the replacement of a conventional thermostat by an electric clock thermostat more economical.

DESCRIPTION OF THE INVENTION

FIG. 1 is a schematic representation of the connection of an electric clock thermostat to a power supply and phase responsive apparatus adapted to control the operation of a furnace.

FIG. 2 is a second embodiment of this specific circuit used in the power supply and phase-responsive apparatus of FIG. 1.

Referring to FIG. 1, an electric clock thermostat 10 or environmental condition responsive apparatus is mounted in a space 11 in which the temperature is to controlled. Thermostat 10 is connected over a circuit using two wires 12 and 13 to a power supply and phase-responsive control apparatus 14. Clock thermostat 10 is similar to the clock thermostat disclosed in the Willis H. Gille U.S. Pat. No. 2,632,797 and has a condition-responsive element or bimetal 20 for controlling a switch 23 in response to the temperature of space 11. The position of bimetal 20 and thus the control or set point of the thermostat can be adjusted in accordance with a time schedule by motor 21 which is connected through a cam mechanism 22 to the support of bimetal 20. A clock 24 has hands which are controlled through a gear train 25 by motor 21 to display the time.

The control point of temperature-responsive element 20 can be adjusted so that switch 23 closes at a predetermined temperature in space 11. The control point can be selectively adjusted at different values depending upon the time of day or night by the homeowner selectively adjusting cam mechanism 22. For example, the thermostats may be set to close switch 23 when the temperature is at 72° F. during the daytime and is at 65° F. during a selected nighttime period. Switch 23 is connected to the circuit of wires 12 and 13 through a capacitor 26 and an adjustable resistor 27.

Apparatus 14 has a relay 30 for controlling a switch 31 adapted to be connected in the energization circuit of environmental condition changing apparatus or a fuel controller or gas valve 32 furnishing fuel to furnace 33 which supplies conditioned medium or heated air to space 11. A transformer 35 is connected to a conventional source to AC power to supply a lower AC voltage from the secondary winding 40 over a circuit comprising diode or unidirectional current conducting device 42 and transistor or semiconductor current control device 43 through circuits 12 and 13 to continuously energize motor 21 of the clock thermostat. Diode 42 and transistor 43 are connected to conduct the current of the opposite half-cycles to provide for full-wave energization of motor 21.

A voltage divider circuit 44 connected across secondary 40 comprises a series connection of a diode or unidirectional current conducting device 45, a resistor 50, a resistor 51 and a resistor 52. Relay 30 and a silicon-controlled rectifier (SCR) or semiconductor current control device 53 are connected in series with diode 45 to secondary 40, so that upon the energization of SCR 53, relay 30 is energized to close switch 31.

The voltage-responsive means or control electrode 54 of rectifier 53 is connected to a terminal 55 in between resistors 51 and 52 so that upon a simultaneous buildup of the voltage across rectifier 53 and across voltage divider circuit 44 during each positive cycle of the AC source, should the voltage at terminal 55 reach the required firing voltage, rectifier 53 will fire to energize relay 30. The relay will remain energized throughout the remaining half-cycle and the next half-cycle as a result of capacitor 60.

Connected to terminal 61, between resistors 50 and 51 is a voltage breakdown means or four-layer diode 62 which has a predetermined high resistance below a certain breakdown voltage at which voltage the resistance drops substantially to zero. Diode 62 is effective to short out resistors 51 and 52 when the voltage at terminal 61 reaches the breakdown voltage.

Transistor 43 is connected with a base terminal 63 to one side of secondary 40 a collector electrode 64 to terminal 55 so that when transistor 43 is conducting, resistor 52 is shorted out and controlled rectifier 53 cannot be energized.

OPERATION OF FIG. 1

With transformer 35 connected to the source of power, motor 21 in the clock thermostat is energized during both half-cycles of AC voltage from secondary 40 through diode 42 during one half-cycle and transistor 43 during the other half-cycle. Upon a call for heat by the thermostat, switch 23 is closed to connect capacitor 26 and resistor 27 in parallel with motor 21 to change the load on circuit 12 and 13 and thus the phase relationship or power factor of the voltage and current supplied to thermostat 10.

Normally, with only the inductive load of the clock motor connected to circuits 12 and 13, the current lags the voltage so that even though the upper end of secondary 40 is positive to place a current downward through the voltage divider circuit 44 at the beginning of such positive half-cycle, the lagging or reverse current to the thermostat over circuit 12 and 13 is flowing through transistor 43 to render the transistor conductive to prevent energization of rectifier 53. Even though the voltage across the voltage divider 44 builds up gradually, as the voltage of rectifier 53 is increased, the rectifier is not energized. By the proper adjustment of the resistance in voltage divider circuit 44, terminal 61 reaches a predetermined voltage level to breakdown diode 62 before the lagging current to the load reverses to deenergize transistor 43. With only motor 21 connected in the circuit, rectifier 53 is not energized and gas is not supplied to the furnace.

Upon a call for heat by thermostat 10 with the closure of switch 23, the power factor and thus the phase relationship of the voltage and current supplied to thermostat 10 over circuit 12 and 13 changes. Assume that the phase relationship now is such that the current is in phase with the voltage to have a zero power factor. When the power source provides a positive voltage at the upper end of transformer 40, and the current to the thermostat is in phase or leading the voltage, the current no longer is flowing from base to emitter through transistor 45, but in the opposite direction through diode 42, hence the transistor is nonconductive. As the voltage builds up on the positive half-cycle through voltage divider 44, the voltage to the input of the controlled rectifier 53 reaches a level to fire rectifier 53 before the voltage at terminal 61 has reached the required level to breakdown diode 62. Once rectifier 53 becomes conductive, even through at a later time during the positive cycle, diode 62 broke down, rectifier 53 remains conductive to maintain relay 30 and thus valve 32 energized for the remaining portion of the positive cycle as well as the reverse cycle since capacitor 60 maintains relay 30 energized. As long as the voltage and current supplied to thermostat 10 over circuits 12 and 13 is in phase or the current leading the voltage, rectifier 53 is energized at the beginning of each positive cycle of the power source.

DESCRIPTION AND OPERATION OF FIG. 2

Referring to FIG. 2, another embodiment of the specific circuit of the power supply and phase-responsive apparatus of panel 14 shown in FIG. 1, is shown with the various elements which are common to the circuit of FIG. 1, labeled with a number ' (primed). A diode or unidirectional current conducting device 70 provides a separate circuit to connect relay 30' and rectifier 53' to the secondary 40 of the transformer of FIG. 1.

In addition a circuit is provided for maintaining relay 30' deenergized should thermostat 10 be removed to have an open circuit between conductors 12 and 13. The circuit has a resistor 69 and diode 71 connected in series between wires 12 and 13 and a capacitor 72 connected between a terminal intermediate resistor 69 and diode 71 and base terminal 63' of transistor 43'.

The operation of the circuit of FIG. 2 is similar to that of the circuit of FIG. 1 in that upon a change in the power factor of the thermostat, current relay 30 is energized. With the additional circuit shown in FIG. 2, if thermostat 10 is removed, for example, for repair, to cause the circuit between wires 12 and 13 to be open, a bias current will continue to flow through transistor 43'. Capacitor 72 discharges through resistor 69 during each positive cycle of the voltage of the power source to maintain transistor conductive and prevent the silicon-controlled rectifier 53' from firing thereby preventing energization of relay 30'.

The embodiments of the invention in which I claim an exclusive property or right are defined as follows:

1. In power supply and phase-responsive apparatus comprising,
    an alternating current source of power, and circuit means adapted to connect said source of power to a load, the load having a supply current and voltage and being adapted to change, to thereby affect the phase relationship of the voltage and current supplied to the load, said circuit means comprising; phase-responsive means responsive to the phase relationship of the voltage and current supplied to the load, and second responsive means connected to said phase-responsive means and responsive to a change in said phase relationship of said voltage and current,
    said load comprises a two-wire circuit adapted to be connected to a remote space thermostat, said thermostat comprising a clock motor and a temperature-responsive circuit means, said load having a first phase relationship when only said motor is connected to said circuit and a second phase relationship when said motor and said temperature-responsive circuit means are connected to said circuit, and
    said second responsive means being operated when the phase relationship of the load changes from a first phase relationship to a second phase relationship, said second responsive means being adapted to control temperature-changing apparatus for supplying temperature-conditioned medium to said source.

2. In an improved two-wire electric clock temperature control system wherein a clock motor and a thermostat located in a space are connected over a two-wire circuit to a remote AC power supply and control apparatus for controlling the operation of a temperature conditioning apparatus supplying temperature conditioned medium to the space comprising,
    first means connected to the thermostat for changing a power factor of a load on the two-wire circuit from a first to a second value when the thermostat calls for a change in the temperature of the medium being supplied to the space, and
    second means connected to the power supply and associated with the control apparatus for responding to said changing power factor to cause the temperature-conditioning apparatus to operate when said power factor has said second value.

3. In the invention of claim 2 wherein said second means comprises;
    a control device becoming conductive for each cycle of AC voltage when a first source of signal voltage is available,
    first means responsive to the presence of current flow in the two-wire circuit in a direction opposite to the normal direction of flow of current during the positive half-cycle of said supply voltage,
    second means connected to said first means to render said source of signal voltage ineffective, and
    third means for rendering said source of signal voltage ineffective when said voltage of said positive half cycle has reached a predetermined value before said current flow reverts to said normal direction of flow.

4. The invention of claim 2 comprising;
    third means connected to said control apparatus for preventing said conditioning apparatus from operating when no load is connected to the two-wire circuit.